United States Patent
Miyazaki et al.

[11] Patent Number: 5,990,201
[45] Date of Patent: Nov. 23, 1999

[54] PSEUDO-PLASTIC AQUEOUS INK FOR BALL POINT PEN

[75] Inventors: Shigeru Miyazaki; Yoji Takeuchi, both of Yokohama, Japan

[73] Assignee: Mitsubishi Pencil Kabushiki Kaisha, Tokyo, Japan

[21] Appl. No.: 09/022,917

[22] Filed: Feb. 12, 1998

[30] Foreign Application Priority Data

Feb. 18, 1997 [JP] Japan .................................. 9-033959

[51] Int. Cl.⁶ ........................ C09D 11/16; C09D 11/18; C09D 183/04; C09D 181/00
[52] U.S. Cl. ................... 523/161; 106/31.13; 106/31.6; 106/31.64; 106/31.69; 106/31.7; 106/31.89
[58] Field of Search ........................ 523/160, 161; 16/31.13, 31.6, 31.64, 31.69, 31.7, 31.72, 31.89, 31.96

[56] References Cited

U.S. PATENT DOCUMENTS

| | | | |
|---|---|---|---|
| 4,059,606 | 11/1977 | Walsingham et al. | 556/444 |
| 4,545,818 | 10/1985 | Inoue et al. | 106/31.38 |
| 4,686,246 | 8/1987 | Gajria | 523/161 |
| 4,786,198 | 11/1988 | Zgambo | 401/142 |
| 5,302,193 | 4/1994 | Wouch et al. | 524/261 |
| 5,348,989 | 9/1994 | Shiraishi | 523/161 |
| 5,466,281 | 11/1995 | Hanke et al. | 106/31.38 |
| 5,523,019 | 6/1996 | Kim | 516/116 |
| 5,547,499 | 8/1996 | Kawasumi et al. | 106/31.25 |
| 5,683,500 | 11/1997 | Kawasumi et al. | 106/31.6 |
| 5,686,519 | 11/1997 | Loftin et al. | 524/462 |

*Primary Examiner*—Vasu Jagannathan
*Assistant Examiner*—Callie E. Shosho
*Attorney, Agent, or Firm*—Darby & Darby

[57] ABSTRACT

A pseudo-plastic aqueous ink for a ball point pen contains at least a pigment, a dispersant, water, a polar solvent and a thickener and further contains 0.05 to 7% by weight of the silicone base surfactant or 0.05 to 5% by weight of a silicone base surfactant and 0.05 to 5% by weight of sodium dialkyl sulfosuccinate based on the whole amount of the ink.

5 Claims, No Drawings

PSEUDO-PLASTIC AQUEOUS INK FOR BALL POINT PEN

BACKGROUND OF THE INVENTION

1. Field of the Invention

The present invention relates to an aqueous ink for a ball point pen, more specifically to a pseudo-plastic aqueous ink for a ball point pen providing the advantages of an oil base ink-filled ball point pen.

2. Description of the Prior Art

In general, what have so far been used as inks for a ball point pen are an aqueous ink of low viscosity containing water or a water soluble solvent as a solvent and having a viscosity of 10 centipoise or lower, and an oil base ink containing a lipophilic solvent such as a mineral oil, a polyhydric alcohol, a fatty acid and Cellosolve as a solvent and having a viscosity of 1000 to 20000 centipoise.

An oil base ink-filled ball point pen using an oil base ink for a ball point pen is of a structure in which the ink adhered on a ball at a pen point through an ink reservoir having a small diameter is transferred on a paper surface by rotation of the ball and only the transferred volume of the ink is fed from the ink reservoir to the ball.

An aqueous ink-filled ball point pen using an aqueous ink for a ball point pen is of a structure in which an ink is fed to a ball surface or a paper surface by means of a capillary action of a feed prepared by binding fine fibers.

While the aqueous ink for a ball point pen and the oil base ink for a ball point pen described above each have excellent advantages respectively, they have various problems.

For example, in the aqueous ink for a ball point pen, a capillary action is used as a principle of feeding the ink because of a low viscosity thereof, wherein simple contact of the point portion of the ball point pen with paper allows the capillary action to be exerted on the contact point thereof to feed the ink, and good writing can be done on a paper surface without applying so much writing pressure, so that splitting, starving and blobbing scarcely take place. On the other hand, loading the ink directly into the ink reservoir allows the ink to leak due to vibration, impact and a rise in an external temperature to make the amount of the ink fed to the ball instable. In order to prevent this, the ball point pen requires a complicated structure having a feed prepared by binding fine fibers and has a problem that it is difficult to check the remaining amount of the ink.

On the contrary, since the oil base ink for a ball point pen has a high viscosity, blobbing of the ink from the pen point can be prevented, and the ink can be loaded directly into the ink reservoir having a small diameter. As a result, a ball point pen filled with the oil base ink is characterized by that the structure of the ball point pen can be simplified and the remaining amount of the ink can be checked by using a transparent material for the ink reservoir. On the other hand, since the ink is transferred only on the paper surface contacted with the rotating ball, splitting and starving are liable to take place if the ball rotates unstably. Further, the ink is hard to penetrate into a paper surface and therefore has a problem that blobbing in which stain is caused by the untransferred ink is liable to take place.

In order to solve such problems, an aqueous ink for a ball point pen (hereinafter referred to as a pseudo-plastic aqueous ink) to which a specific viscosity characteristic is given by adding a gelling agent and a water soluble paste to a water soluble ink is provided in recent years.

In an aqueous ink-filled ball point pen using this pseudo-plastic aqueous ink, an ink viscosity is reduced when being used to write since shearing force is applied to the ink by rotation of the ball at the tip point, so that the ball point pen can write as smoothly as conventional aqueous ink-filled ball point pens and make good writing on a paper surface. Further, blobbing of the ink from the pen point can be prevented since the ink has a high viscosity when the ball point pen is not in use. The aqueous ink-filled ball point pen using this pseudo-plastic aqueous ink makes it possible to store the ink directly into the ink reservoir and simplify the structure thereof. In addition thereto, the remaining amount of the ink can be checked by using a transparent material for the ink reservoir.

Thus, the use of a pseudo-plastic aqueous ink for a ball point pen provides a writing tool having both characteristics of an aqueous ink-filled ball point pen and an oil base ink-filled ball point pen. However, an actual preparation of a pseudo-plastic aqueous ink for a ball point pen on a trial basis shows that it is very difficult to maintain the intended quality of the ball point pen without controlling the viscosity of the ink according to the tip used. For example, if the pseudo-plastic aqueous ink having a quality which is suited to a tip for a ball having a small diameter is used for a tip for a ball having a large diameter, produced are problems that a clearance between the ball and the holder changes and blobbing and splitting are caused due to a reduction in shearing force exerted to the ink in writing and that the drying property of the drawn lines is reduced because of the excess flow amount of the ink.

The present invention has been made in order to solve the problems described above, and an object thereof is to provide a pseudo-plastic aqueous ink for a ball point pen which can meet tips under any condition for ball diameters, materials, dimensions and the like and which always provides a smooth writing and a stable flow amount without causing blobbing and splitting and is high in stability on standing and a drying property of the drawn lines.

SUMMARY OF THE INVENTION

Various investigations continued by the present inventors in order to solve the problems described above have resulted in finding that the object of the present invention can be achieved by blending an aqueous ink with a specific amount of a specific surfactant in order to remove the problems of blobbing, splitting and a reduction in a drying property which are brought about in writing with a ball point pen filled with a pseudo-plastic aqueous ink, and thus coming to complete the present invention.

The pseudo-plastic aqueous ink for a ball point pen according to the present invention is characterized by containing at least a pigment, a dispersant, water, a polar solvent and a thickener and further containing 0.05 to 7% by weight of a silicone base surfactant based on the whole amount of the ink.

The second pseudo-plastic aqueous ink for a ball point pen according to the present invention is characterized by containing at least a pigment, a dispersant, water, a polar solvent and a thickener and further containing 0.05 to 5% by weight of sodium dialkyl sulfosuccinate and 0.05 to 5% by weight of a silicone base surfactant based on the whole amount of the ink.

The pseudo-plastic aqueous ink for a ball point pen according to the present invention is optimally provided with a stable quality regardless of the ball diameter of the tip by adding the silicone base surfactant or the silicone base surfactant and sodium dialkyl sulfosuccinate as an alternative for a surfactant used for a conventional aqueous ink.

DETAILED DESCRIPTION OF THE PREFERRED EMBODIMENTS

In the present invention, the pseudo-plasticity means the fact that the fluidity is very low and the apparent viscosity is large in a static state or when external force is small (low shearing force) while the fluidity increases very much and the viscosity decreases drastically when the external force grows larger (high shearing force).

The silicone base surfactant used for the pseudo-plastic aqueous ink for a ball point pen according to the present invention includes polyether-modified methyl polysiloxane, polyether-modified dimethyl polysiloxane, polyether-modified methyl polysiloxane.dimethyl polysiloxane copolymer, polyether-modified polyoxyethylene.methyl polysiloxane copolymer, polyether-modified polyoxypropylene.methyl polysiloxane copolymer and polyether-modified poly(oxyethylene.oxypropylene)methyl polysiloxane copolymer. These silicone base surfactants may be used alone or in a mixture of two or more kinds thereof.

Sodium dialkyl sulfosuccinate used for the pseudo-plastic aqueous ink for a ball point pen according to the present invention is represented by the following formula:

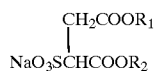

($R_1$ and $R_2$ represent an alkyl group having 1 to 15 carbon atoms).

To be specific, sodium di-2-ethylhexyl sulfosuccinate and sodium dioctyl sulfosuccinate can be given. Sodium dialkyl sulfosuccinate has an effect of providing the ink with a lubricity and improving the penetration capability into a writing paper surface.

The content of the silicone base surfactant used for the first pseudo-plastic aqueous ink for a ball point pen according to the present invention is 0.05 to 7% by weight based on the whole amount of the ink. The content of less than 0.05% by weight does not provide the effect, and the content of more than 7% by weight notably reduces the surface tension and is liable to cause seepage and blobbing of the ink at the pen point.

Further, the content of the silicone base surfactant used for the second pseudo-plastic aqueous ink for a ball point pen according to the present invention is 0.05 to 5% by weight based on the whole amount of the ink. The content of less than 0.05% by weight does not provide the effect, and the content of more than 5% by weight is liable to cause the seepage and blobbing of the ink at the pen point. On the other hand, the content of sodium dialkyl sulfosuccinate is 0.05 to 5% by weight based on the whole amount of the ink. The content of less than 0.05% by weight reduces the penetration effect, and the content of more than 5% by weight increases the feathering and makes the drawn lines indistinct.

Next, other components used for the pseudo-plastic aqueous ink for a ball point pen according to the present invention shall be explained.

The kind of the pigment shall not specifically be restricted, and optional ones among inorganic and organic pigments which have so far been conventionally used for aqueous ink compositions can be used. Further, inorganic fluorescent pigments and organic fluorescent pigments can be used as well.

The inorganic pigments include, for example, titanium oxide, carbon black, red iron oxide, chromium oxide, black iron oxide, cobalt blue, alumina white, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium, barite powder, calcium carbonate, lead white, Prussian blue, manganese violet, aluminum powder, stainless powder, nickel powder, copper powder and zinc powder.

The organic pigments include, for example, azo lakes, insoluble azo pigment, phthalocyanine pigments, perylene and perinone pigments, anthraquinone pigments, quinacridone pigments, dye lakes, nitro pigments and nitroso pigments. To be specific, there can be used phthalocyanine blue (C. I. 74160), phthalocyanine green (C. I. 74260), Hansa yellow 3G (C. I. 11670), disazo yellow GR (C. I. 21100), permanent red 4R (C. I. 12335), Brilliant carmine 6B (C. I. 15850) and quinacridone red (C. I. 46500).

The inorganic fluorescent pigments are prepared by adding trace amounts of activating agents such as copper, silver and manganese to high purity sulfides of heavy metals or alkaline earth metals such as zinc sulfide which are used as raw materials and calcining them at a high temperature.

The organic fluorescent pigments are solid solutions prepared by dissolving fluorescent dyes in the vehicles of synthetic resins or ones prepared by dyeing the dispersed matters of fine resin particles obtained by emulsion polymerization or suspension polymerization with fluorescent dyes. The synthetic resins include vinyl chloride resins, alkid resins and acrylic resins, and the fluorescent dyes include C. I. acid yellow 7, C. I. basic red 1 and the like.

The pigments described above may be used alone or in combination of two or more kinds thereof. The blend amount thereof is selected in a range of usually 2 to 30% by weight, preferably 5 to 15% by weight based on the whole weight of the ink.

When using the pigments are used as colorants, a dispersant is required for dispersing the pigments. The dispersant is used for dispersing the pigments in water with being adsorbed on the surface of the pigment particles, and nonionic or anionic surfactants and water soluble polymers are used. The water soluble polymers are preferably used.

The nonionic surfactants include polyoxyalkylene higher fatty acid esters, higher fatty acid partial esters of polyhydric alcohols and higher fatty acid esters of sugar. To be specific, they include glycerin fatty acid esters, polyglycerin fatty acid esters, propylene glycol fatty acid esters, pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene phytosterols, polyoxyethylene polyoxypropylene alkyl ethers, polyoxyethylene alkylphenyl ethers, polyoxyethylene castor oil, polyoxyethylene lanolin, polyoxyethylene lanolin alcohols, polyoxyethylene alkylamines, polyoxyethylene fatty acid amides and polyoxyethylene alkylphenyl formaldehyde condensation products.

The anionic surfactants include alkyl sulfonic acid salts of higher fatty acid amides and alkylarylsulfonic acid salts. To be specific, they include alkylsulfuric acid salts, polyoxyethylene alkyl ether sulfuric acid salts, N-acylamino acid salts, N-acylmethyltaurine salts, polyoxyethylene alkyl ether acetic acid salts, alkylphosphoric acid salts and polyoxyethylene alkyl ether phosphoric acid salts.

The water soluble polymers include polyacrylic acids, acrylic acid copolymers and a maleic acid resin. To be specific, used are those obtained by turning resins such as an acrylic acid resin, a styrene-acrylic acid resin and a styrene-maleic acid resin into salt forms to make water soluble. Sodium and potassium are typical as alkali metals for forming the salts, and typical as amines for forming the salts are aliphatic primary to tertiary amines such as mono-, di- or tri-methylamine, alkanolamines such as mono-, di- or tri-propanolamine, methylethanolamine, methylpropanolamine and dimethylethanolamine, ammonia, morpholine, and N-methylmorpholine.

The blend amount of the dispersant is selected in a range of 0.1 to 10% by weight based on the whole amount of the ink.

The content of water added to the ink of the present invention shall not specifically be restricted and is preferably 40 to 90% by weight based on the whole amount of the ink. The content of less than 40% by weight relatively increases the contents of the solvent and the colorant and therefore makes it difficult to volatilize the solvent, so that the ink is hard to dry when being used to write on paper. On the other hand, the content exceeding 90% by weight makes it easy to volatilize the solvent to make the pen point dry, so that inferior writing is brought about. Accordingly, both are not preferred.

Polar solvents may be used for the ink of the present invention. All solvents which have polar groups and are compatible with water can be used as polar solvents. Such solvents include alkylene glycols such as ethylene glycol, diethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol and 3-methylpentane-1,5-diol; triols such as 1,2,3-butanetriol, 1,2,4-butanetriol, 3-methylpentane-1,3,5-triol and 1,2,3-hexanetriol; polyalkylene glycols such as polyethylene glycol and polypropylene glycol; glycerols such as glycerol, diglycerol and triglycerol; lower alkyl ethers of glycols such as ethylene glycol monomethyl ether, ethylene glycol monoethyl ether, diethylene glycol monomethyl ether, diethylene glycol monoethyl ether and diethylene glycol mono-n-butyl ether; thiodiethanol, N-methyl-2-pyrrolidone, 1,3-dimethyl-2-imidazolidinone and sulfolane.

Usually, the content of the polar solvent is selected in a range of 40% by weight or less, preferably 5 to 40% by weight based on the whole amount of the ink. The content exceeding 40% by weight causes a strike-through of the ink when the ink is used to write on paper or makes it difficult to allow the ink to dry up. Accordingly, such content is not preferred. These solvents elevates the non-drying property of the ink.

The thickeners include gum arabic, tragacanth gum, locust bean gum, guar gum and derivatives thereof, alginic acid, alginates, pectin, carrageenan, gelatin, casein, sodium casein, xantane gum, ramzan gum, weran gum, gellan gum, dextran, methyl cellulose, ethyl cellulose, hydroxyethyl cellulose, carboxymethyl cellulose, hydroxypropyl cellulose, sodium starch glicolate, lanolin derivatives, chitosan derivatives, lactalbumin, polyethylene oxides, polyethylene glycols, polyvinyl alcohol, polyvinyl methyl ether, polyvinylpyrrolidone and derivatives thereof, polyacrylic resins, cross-linking polyacrylic resins, polyurethane resins, and alkali metal salts of acrylic resins.

In addition to the compounds described above, lubricants, rust preventives, preservatives, pH controlling agents and dryness inhibitors can be added, if necessary, to the ink of the present invention.

The lubricants include fatty acid salts such as potassium linoleate, potassium oleate and sodium oleate, polyalkylene glycol derivatives such as polyoxyethylene lauryl ether, and nonionic surfactants.

The rust preventives include tolyltriazole, benzotriazole and derivatives thereof, fatty acid phosphorus derivatives such as octyl phosphate and dioctyl thiophosphate, imidazole, benzimidazole and derivatives thereof, 2-mercaptobenzothiazole, octyloxymethanephosphonic acid, dicyclohexylammonium nitrite, diisopropylammonium nitrite, propargyl alcohol and dialkylthiourea.

The pH controlling agents include inorganic alkalis and organic amines. The inorganic alkalis include, for example, sodium hydroxide, potassium hydroxide, calcium hydroxide, sodium carbonate and sodium hydrogencarbonate. The organic amines include, for example, ammonia, methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine, N,N-dimethylbutylamine, 1,2-dimethylpropylamine, N-ethyl-1,2-dimethylpropylamine, allylamine, diallylamine, triallylamine, N,N-dimethylallylamine, N-methyldiallylamine, 3-pentaneamine, N,N-diisopropylethylamine, 2-(hydroxymethylamino)ethanol, 2-aminopropnol, 3-aminopropnol, triethanolamine, monoethanolamine, diethanolamine, 2-amino-2-methyl-1-propanol, N-isobutyldiethanolamine, 3-methoxypropylamine, 3-propyloxypropylamine, 3-isopropyloxypropylamine and 3-butoxypropylamine.

The dryness inhibitors include urea, thiourea, ethyleneurea and derivatives thereof.

The pseudo-plastic aqueous ink for a ball point pen according to the present invention can readily be produced by heating for melting and stirring for mixing the components described above according to necessity. The pseudo-plastic aqueous ink for a ball point pen according to the present invention is prevented from causing blobbing and splitting phenomena regardless of the diameter, the material and the dimension of the ball by adding as a surfactant the silicone base surfactant which is different from conventional ones, or the silicone base surfactant and sodium dialkyl sulfosuccinate to an aqueous ink, so that smooth writing and a stable flow amount is always obtained, and the stability on standing and the drying property of the drawn lines are enhanced.

The silicone base surfactant has a capability of lowering the surface tension of the ink, and the ink containing sodium dialkyl sulfosuccinate has a capability of lowering the interfacial tension of the solid/liquid. The ink having such properties is improved in a wettability to the tip when used for a ball point pen, and therefore the ball point pen can stably write without causing a break of the ink even if any ball is used (that is, even if shearing force exerted to the ink changes). Further, the ink is low in an interfacial tension against a paper surface and has a satisfactory penetration effect, so that the ink has a high drying property of the drawn lines and can be prevented from causing blobbing and splitting.

EXAMPLES

The present invention shall more specifically be explained below with reference to examples, but the present invention shall by no means be restricted by these examples.

The following tests were carried out to the inks obtained in the examples and the comparative examples.

(1) Writing Performance:

The ball point pens were used for writing by means of a writing test machine, and the flow conditions of the inks were evaluated according to the following criteria:

○ Writable smoothly

Δ Slightly scratching

× Starved (2) Blobbing Prevention:

After writing under the conditions of a speed of 4.5 m/minute, an angle of 60° and a load of 100 gf by means of the writing test machine, an ink amount adhered to the tip holder and surplus ink spots fallen down during drawing the line were observed and evaluated according to the following criteria:

○ Blobbing scarcely found

Δ Blobbing slightly found

× Much blobbing found (3) Splitting Prevention:

The ball point pens were used for writing by means of the writing test machine, and the conditions of the drawn lines were evaluated according to the following criteria:

○ Good without causing splitting

Δ A little splitting

× Much splitting (4) Speedy Writability:

The followabilitie of the inks were evaluated according to the following criteria when the ball point pens were used for writing with a hand at twice speed as great as usual:

○ Well writable without causing starving of the drawn lines

Δ A little starving

× Much starving (5) Drawn Line Dryability:

Spiral was drawn on a writing paper in an air-conditioned room having a temperature of 25° C. and a humidity of 65%, and after 10 seconds, the spiral was rubbed with a commercial cotton swab to observe and evaluate stain caused by the ink according to the following criteria:

○ No stain

Δ A little stain

× Stained

Example 1

The respective components excluding polyacrylic acid among the following components were stirred for 3 hours by means of a stirrer to mix, and then they were dispersed for 5 hours by means of a sand mill. Further, the coarse particles were removed by means of a centrifugal separator, and then polyacrylic acid was slowly added while stirring at room temperature. After further stirring for 3 to 4 hours, filtration was carried out to prepare a black pseudo-plastic aqueous ink for a ball point pen.

| | |
|---|---|
| Carbon black MA-100 (manufactured by Mitsubishi Chemical Co., Ltd.) | 8.0% by weight |
| Propylene glycol | 15.0 |
| Ammonium salt of styrene-acryl resin | 3.0 |
| Triethanolamine | 0.5 |
| Silicone base surfactant (FZ-2165 manufactured by Nippon Unicar Co., Ltd.) | 0.2 |
| Potassium oleate | 0.3 |
| Polyacrylic acid | 0.4 |
| Purified water | 72.6 |
| Total | 100.0 |

Example 2

A black pseudo-plastic aqueous ink for a ball point pen was prepared in the following formation in the same manner as in Example 1.

| | |
|---|---|
| Carbon black MA-100 (manufactured by Mitsubishi Chemical Co., Ltd.) | 8.0% by weight |
| Propylene glycol | 15.0 |
| Ammonium salt of styrene-acryl resin | 3.0 |
| Triethanolamine | 0.5 |
| Silicone base surfactant (FZ-2165 manufactured by Nippon Unicar Co., Ltd.) | 0.1 |
| Sodium dioctyl sulfosuccinate (Pelex TO-P manufactured by Kao Corporation) | 0.3 |
| Potassium oleate | 0.3 |
| Polyacrylic acid | 0.4 |
| Purified water | 72.4 |
| Total | 100.0 |

Example 3

The respective components excluding cross-linking polyacrylic acid among the following components were stirred for 2 hours by means of a stirrer to mix, and then they were dispersed for 5 hours by means of a sand mill. Further, the coarse particles were removed by means of a centrifugal separator, and then cross-linking polyacrylic acid was slowly added while stirring at room temperature. After further stirring for 3 to 4 hours, filtration was carried out to prepare a blue pseudo-plastic aqueous ink for a ball point pen.

| | |
|---|---|
| Phthalocyanine blue (manufactured by Dainichiseika Color & Chemicals MFG. Co., Ltd.) | 7.0% by weight |
| Glycerin | 25.0 |
| Ammonium salt of styrene-maleic acid resin | 3.0 |
| Triethanolamine | 0.5 |
| Silicone base surfactant (L-7002 manufactured by Nippon Unicar Co., Ltd.) | 0.1 |
| Sodium oleate | 0.3 |
| Tolyltriazole | 0.1 |
| Cross-linking polyacrylic acid | 0.4 |
| Phenol | 0.1 |
| Purified water | 63.5 |
| Total | 100.0 |

Example 4

A blue pseudo-plastic aqueous ink for a ball point pen was prepared in the following formation in the same manner as in Example 3.

| Phthalocyanine blue | 7.0% by weight |
| --- | --- |
| (manufactured by Dainichiseika Color & Chemicals MFG. Co., Ltd.) | |
| Glycerin | 25.0 |
| Ammonium salt of styrene-maleic acid resin | 3.0 |
| Triethanolamine | 0.5 |
| Silicone base surfactant | 0.1 |
| (L-7002 manufactured by Nippon Unicar Co., Ltd.) | |
| Sodium dioctyl sulfosuccinate | 0.3 |
| (Pelex OT-P manufactured by Kao Corporation) | |
| Sodium oleate | 0.3 |
| Tolyltriazole | 0.1 |
| Cross-linking polyacrylic acid | 0.4 |
| Phenol | 0.1 |
| Purified water | 63.2 |
| Total | 100.0 |

Comparative Example 1

A black pseudo-plastic aqueous ink for a ball point pen was obtained by repeating the same preparation as in Example 1, except that the silicone base surfactant was not used and purified water was increased to 72.8% by weight to make up for it.

Comparative Example 2

A black pseudo-plastic aqueous ink for a ball point pen was obtained by repeating the same preparation as in Example 2, except that the silicone base surfactant and sodium dioctyl sulfosuccinate were not used and purified water was increased to 72.8% by weight to make up for it.

Comparative Example 3

A blue pseudo-plastic aqueous ink for a ball point pen was obtained by repeating the same preparation as in Example 3, except that the silicone base surfactant was not used and purified water was increased to 63.6% by weight to make up for it.

Comparative Example 4

A blue pseudo-plastic aqueous ink for a ball point pen was obtained by repeating the same preparation as in Example 4, except that the silicone base surfactant and sodium dioctyl sulfosuccinate were not used and purified water was increased to 63.6% by weight to make up for it.

The inks obtained by procedures carried out in Examples 1 to 4 and the inks obtained by procedures carried out in Comparative Examples 1 to 4 were charged respectively into a ball point pen having a ball diameter of 0.5 mm and into a ball point pen having a ball diameter of 1.0 mm and subjected to writing tests to evaluate the qualities of the inks. The results thereof are shown in Table 1.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| 0.5 mm ball | Writing performance | ○ | ○ | ○ | ○ | ○ | ○ | Δ | Δ |
|  | Blobbing prevention | ○ | ○ | ○ | ○ | ○ | ○ | ○ | ○ |
|  | Splitting prevention | ○ | ○ | ○ | ○ | ○ | ○ | ○ | ○ |
|  | Speedy writability | ○ | ○ | ○ | ○ | ○ | ○ | ○ | ○ |
|  | Drawn line dryability | ○ | ○ | ○ | ○ | ○ | ○ | ○ | ○ |
| 1.0 mm ball | Writing performance | ○ | ○ | ○ | ○ | ○ | ○ | ○ | ○ |
|  | Blobbing prevention | ○ | ○ | ○ | ○ | Δ | Δ | Δ | Δ |
|  | Splitting prevention | ○ | ○ | ○ | ○ | Δ | Δ | Δ | Δ |
|  | Speedy writability | ○ | ○ | ○ | ○ | Δ | Δ | Δ | Δ |
|  | Drawn line dryability | ○ | ○ | ○ | ○ | X | X | X | X |

What is claimed is:

1. A pseudo-plastic aqueous ink for a ball point pen comprising at least a pigment, a dispersant, water, a polar solvent and a thickener, wherein said ink further comprises 0.05 to 7% by weight of a silicone base surfactant based on the whole amount of the ink.

2. The pseudo-plastic aqueous ink for a ball point pen as described in claim 1, wherein the silicone base surfactant is selected from the group consisting of polyether-modified methyl polysiloxane, polyether-modified dimethyl polysiloxane, polyether-modified methyl polysiloxane.dimethyl polysiloxane copolymer, polyether-modified polyoxyethylene.methyl polysiloxane copolymer, polyether-modified polyoxypropylene.methyl polysiloxane copolymer, polyether-modified poly(oxyethylene.oxypropylene)methyl polysiloxane copolymer and mixtures thereof.

3. A pseudo-plastic aqueous ink for a ball point pen comprising at least a pigment, a dispersant, water, a polar solvent and a thickener, wherein said ink further comprises 0.05 to 5% by weight of a silicone base surfactant and 0.05 to 5% by weight of sodium dialkyl sulfosuccinate based on the whole amount of the ink.

4. The pseudo-plastic aqueous ink for a ball point pen as described in claim 3, wherein the silicone base surfactant is selected from the group consisting of polyether-modified methyl polysiloxane, polyether-modified dimethyl polysiloxane, polyether-modified methyl polysiloxane.dimethyl polysiloxane copolymer, polyether-modified polyoxyethylene.methyl polysiloxane copolymer, polyether-modified polyoxypropylene.methyl polysiloxane copolymer, polyether-modified poly(oxyethylene.oxypropylene)methyl polysiloxane copolymer and mixtures thereof.

5. The pseudo-plastic aqueous ink for a ball point pen as described in claim 3, wherein said sodium dialkyl sulfosuccinate is sodium di-2-ethylhexyl sulfosuccinate or sodium dioctyl sulfosuccinate.

* * * * *